(12) United States Patent
Doettling et al.

(10) Patent No.: US 9,151,446 B2
(45) Date of Patent: Oct. 6, 2015

(54) METHOD AND SYSTEM FOR CONFIGURING A MONITORING DEVICE FOR MONITORING A SPATIAL AREA

(75) Inventors: Dietmar Doettling, Leinfelden-Echterdingen (DE); Oliver Fuchs, Esslingen (DE); James Sugrue, Rochestown (IE)

(73) Assignee: PILZ GMBH & CO. KG, Ostfildern (DE)

( * ) Notice: Subject to any disclaimer, the term of this patent is extended or adjusted under 35 U.S.C. 154(b) by 1016 days.

(21) Appl. No.: 12/142,339

(22) Filed: Jun. 19, 2008

(65) Prior Publication Data

US 2009/0015663 A1    Jan. 15, 2009

Related U.S. Application Data

(63) Continuation of application No. PCT/EP2006/011963, filed on Dec. 13, 2006.

(30) Foreign Application Priority Data

Dec. 22, 2005  (DE) .......................... 10 2005 063 217

(51) Int. Cl.
*F16P 3/14* (2006.01)
*G06T 15/00* (2011.01)
*G06T 7/00* (2006.01)

(52) U.S. Cl.
CPC . *F16P 3/14* (2013.01); *F16P 3/142* (2013.01); *G06T 7/0008* (2013.01); *G06T 7/0075* (2013.01); *G06T 15/00* (2013.01)

(58) Field of Classification Search
CPC . G06T 15/00; A63F 2300/64; A63F 2300/66; G09B 9/05

USPC .................. 348/46, 51, 64, 175, 177
See application file for complete search history.

(56) References Cited

U.S. PATENT DOCUMENTS

| | | | |
|---|---|---|---|
| 6,009,189 A * | 12/1999 | Schaack ........................ | 382/154 |
| 6,297,844 B1 | 10/2001 | Schatz et al. | |
| 2001/0025229 A1* | 9/2001 | Moritz et al. ..................... | 703/1 |
| 2002/0075171 A1* | 6/2002 | Kuntman et al. ............. | 340/961 |
| 2002/0175997 A1 | 11/2002 | Takata et al. | |
| 2004/0202364 A1 | 10/2004 | Otani et al. | |
| 2004/0225432 A1* | 11/2004 | Pilley et al. ................... | 701/117 |
| 2005/0055568 A1* | 3/2005 | Agrawala et al. ............. | 713/200 |
| 2005/0123171 A1* | 6/2005 | Kobayashi et al. ........... | 382/103 |
| 2005/0207618 A1 | 9/2005 | Wohler et al. | |

(Continued)

FOREIGN PATENT DOCUMENTS

| | | |
|---|---|---|
| DE | 41 13 992 A1 | 11/1992 |
| DE | 197 09 799 A1 | 9/1998 |

(Continued)

*Primary Examiner* — Barbara Burgess
(74) *Attorney, Agent, or Firm* — Harness, Dickey & Pierce, P.L.C.

(57) ABSTRACT

A monitoring device for monitoring a spatial area comprises at least one image recording unit. A three-dimensional image of the spatial area is recorded and displayed in order to configure. the monitoring device. A configuration plane is defined using a plurality of spatial points which have been determined within the three-dimensional image. Subsequently, at least one variable geometry element is defined relative to the configuration plane. A data record which represents a transformation of the geometry element into the spatial area is generated and transferred to the monitoring device.

22 Claims, 3 Drawing Sheets

(56) References Cited

U.S. PATENT DOCUMENTS

| | | | |
|---|---|---|---|
| 2006/0173268 A1* | 8/2006 | Mullick et al. | 600/407 |
| 2006/0262876 A1* | 11/2006 | LaDue | 375/295 |
| 2007/0082276 A1* | 4/2007 | van Adrichem | 430/5 |

FOREIGN PATENT DOCUMENTS

| | | |
|---|---|---|
| DE | 101 38 960 A1 | 2/2003 |
| DE | 10 2004 020 998 | 11/2005 |
| EP | 1 065 522 B1 | 1/2001 |
| EP | 1 422 496 A1 | 5/2004 |
| JP | 4-60817 | 2/1992 |
| JP | 8-202437 | 8/1996 |
| JP | 9-282459 | 10/1997 |
| JP | 10-40380 | 2/1998 |
| JP | 10-100415 | 4/1998 |
| JP | 2001-17422 | 1/2001 |
| JP | 2001-233139 | 8/2001 |
| JP | 2003-46911 | 2/2003 |
| JP | 2004-088380 | 3/2004 |
| WO | WO 01/39513 A1 | 5/2001 |
| WO | WO 2004/029502 | 4/2004 |

* cited by examiner

METHOD AND SYSTEM FOR CONFIGURING A MONITORING DEVICE FOR MONITORING A SPATIAL AREA

CROSS REFERENCES TO RELATED APPLICATIONS

This application is a continuation of international patent application PCT/EP2006/011963, filed on Dec. 13, 2006 designating the U.S., which international patent application has been published in German language as WO 2007/079883 A2 and claims priority from German patent application DE 10 2005 063 217.3, filed on Dec. 22, 2005. The entire contents of these priority applications are incorporated herein by reference.

BACKGROUND OF THE INVENTION

The present invention relates to a method and a system for configuring a monitoring device for monitoring a spatial area, in particular for configuring a monitoring device for failsafely monitoring a working area of a machine or installation, which is operated in an automated manner.

Working areas of machines or installations operating in automated manner are traditionally safeguarded by mechanical barriers (protective fences, protective doors) and/or by light barriers, light curtains, laser scanners et cetera as protection against accidents. As soon as a person or an object breaks through the barrier, the machine or installation is stopped or otherwise rendered harmless.

In the case of complex machines and installations, the expenditure for such protection can become very high. Light barriers, light curtains and the like must be aligned and mounted very accurately. Moreover, they can only monitor a straight area between light transmitter and light receiver so that a plurality of light barriers, light curtains et cetera are needed in order to protect a complex working area all around. In addition mechanical barriers and conventional light barriers, light curtains et cetera only provide limited flexibility so that the adaptation of the monitoring and protective spaces to changing working environments is expensive.

In order to avoid these disadvantages, it has been proposed for some time to safeguard the working spaces of hazardous machines and installations by means of cameras and modern methods of image processing. Such a method and a corresponding device are described, for example, in WO 2004/029502 A1, which is incorporated by reference herewith. This monitoring device uses at least two image recording units which simultaneously record the working area of the machine to be protected. The images of the two image recording units are subjected to stereo analysis including three-dimensional scenery analysis methods in order to determine range information.

DE 10 2004 020 998 A1, which is also incorporated by reference herewith, discloses another aspect of such a monitoring device, namely an advantageous implementation of the imaging optics for the image recording unit. In addition, it is proposed here to arrange at least one reference object within the monitored area in order to detect, for example, an impairment of the reliability of detection due to contamination, water drops and other items.

EP 1 065 522 B1 discloses a monitoring device wherein the propagation times of light pulses are detected by means of an image recording unit in order to obtain a three-dimensional image of a monitored spatial area. A comparison with previously stored reference values is supposed to allow to detect if an object has penetrated into a monitored area.

Further monitoring devices using image recording units are disclosed by DE 197 09 799 A1 and DE 101 38 960 A1. The first-mentioned document proposes a stereoscopic image evaluation for generating three-dimensional image signal sets and comparing them with corresponding reference signal sets. Objects can be detected if the current scene situation deviates from the reference model. DE 101 38 960 A1 proposes a method wherein range information is determined by means of brightness differences.

Finally, DE 41 13 992 A1 discloses a method for automatic three-dimensional monitoring of hazardous spaces wherein the images from at least two electronic imagers are evaluated with computer assistance in the monitoring phase. In this arrangement, the at least two imagers are calibrated to a common coordinates system This method operates in accordance with the principle of crossed light barriers. In the monitoring phase, the pixels of the imagers are checked for changes.

All these monitoring devices have in common that they attempt to record a three-dimensional image of the monitored spatial area in order to decide whether the machine or installation has to be stopped. The term "three-dimensional image" means an image of the spatial area which, in addition to the usual (2-dimensional) image, also comprises range information from individual or all objects in the spatial area. The range information can be obtained, for example, by propagation time measuring methods, stereoscopic image processing or in any other way.

Monitoring devices operating in accordance with this principle only need little installation and assembly expenditure since they can observe the spatial area from a central position. In addition, they are very flexible since the individual monitoring areas can be flexibly defined. In principle, arbitrarily curved courses and contours within the three-dimensional image can be defined as "virtual protection fences" or "virtual protection spaces". As soon as an object penetrates into the virtual protection space or breaks through a virtual protection fence, a safety function is triggered as is known from the protection with protective doors, light barriers, light gratings and the like. It is also easily possible to change or adapt the virtual protection area when the machine or installation is in operation.

On the other hand, the high flexibility due to the virtual protection areas provides difficulties when setting up and configuring the monitoring device at a machine or installation. During assembly of a protective fence or a light curtain at a machine or installation, the course of the protection area can be easily recognized due to the mechanical arrangement of the barriers. However, this does not apply to the monitoring devices with virtual protection spaces.

Moreover, the position and the exact course of the virtual protection spaces is a safety-related feature. It should be ensured that a virtual protection space in reality extends exactly where it is intended to extend. Otherwise, undetected break-ins into the hazardous area of the monitored installation and thus grave injuries and personal damage could occur. In addition, it is desired to ensure that there are no gaps in the virtual protective fence which is difficult due to the high degree of freedom of design and flexibility of the virtual protective spaces.

Abovementioned DE 41 13 992 A1 proposes, for setting up a protective space, to place so-called measurement markings onto spatial positions which are intended to span a monitoring area. After that, the space coordinates of the measurement markings are determined by means of the recorded images. The space coordinates obtained span the monitoring area. However, this method for setting up monitoring areas is not optimal because the setting-up requires physical access to the marking points. In addition, DE 41 13 992 A1 does not disclose any mechanisms for ensuring failsafe configuration of a monitoring area.

SUMMARY OF THE INVENTION

Against this background, it is an object of the present invention to provide a method for configuring a monitoring device of the aforementioned type so that monitoring areas can be configured in a simple, convenient and failsafe manner.

According to one aspect of the invention, there is provided a method for configuring a monitoring device for monitoring a spatial area, wherein the monitoring device comprises at least one image recording unit adapted to generate a three-dimensional image of the spatial area, the method comprising the steps of: recording and displaying a true three-dimensional image of the spatial area by means of the at least one image recording unit, determining a plurality of spatial points within the true three-dimensional image, defining a configuration plane using said spatial points, generating at least one variable geometry element relative to the configuration plane, with the geometry element being visually superimposed onto the displayed true three-dimensional image, generating a data record representing a transformation of the geometry element into the spatial area, and transferring said data record to the monitoring device, wherein the monitoring device is designed for monitoring the spatial area as a function of said data record.

According to another aspect of the invention, there is provided a system for monitoring a spatial area, comprising at least one image recording unit for generating a true three-dimensional image of the spatial area, comprising an evaluating unit for triggering a control function in dependence on the three-dimensional image, and comprising a configuration device for configuring the evaluating unit, the configuration device comprising: a display for displaying the true three-dimensional image of the spatial area, a first configuration element for determining a plurality of spatial points within the true three-dimensional image, a second configuration element for defining a configuration plane by using said spatial points, a third configuration element for generating at least one variable geometry element relative to the configuration plane, wherein the third configuration element is designed for superimposing the variable geometry element onto the true three-dimensional image, a fourth configuration element for generating a data record which represents a transformation of the geometry element into the spatial area, and a communication interface for transferring the data record to the evaluating unit, with the evaluating unit being designed to monitor the spatial area as a function of the data record.

According to a third aspect, there is provided a data storage medium comprising program code which is designed to be executed on a computer in order to carry out a method of configuring a monitoring device for monitoring a spatial area, wherein the monitoring device has at least one image recording unit for generating a three-dimensional image of the spatial area, and wherein the method comprises the steps of: recording and displaying a true three-dimensional image of the spatial area by means of the at least one image recording unit, determining a plurality of spatial points within the true three-dimensional image, defining a configuration plane using said spatial points, generating at least one variable geometry element relative to the configuration plane, with the geometry element being visually superimposed onto the true three-dimensional image displayed, generating a data record which represents a transformation of the geometry element into the spatial area, and transferring the data record to the monitoring device, with the monitoring device being designed for monitoring the spatial area using said data record.

In a preferred embodiment, a commercially available PC is used in conjunction with such a computer program as a configuration device.

The new method and system use a real or true image of the spatial area for defining the monitoring areas. In preferred embodiments, a "frozen" real image of the spatial area is used, i.e. a real image stored in the configuration device. This has the advantage that the monitoring areas can be configured in the configuration device without the configuration device being connected to the image recording unit during the configuration. As an alternative, however, it is also possible to perform the configuration by using a live image of the at least one image recording unit.

The new method and system involve that a plurality of spatial points are determined in the real image or by means of the real image, and that a configuration plane is defined using these spatial points. Determining the spatial points includes that the space coordinates of selected and/or identified spatial points of the three-dimensional real image are determined. Defining a configuration plane by using these identified spatial points creates an unambiguous relationship between the "virtual" configuration plane and the real spatial area. This relationship allows virtual geometry elements to be defined which are in an unambiguous and well-defined relation to the real spatial area. With the generation and transmission of a corresponding data record to the monitoring device, in particular to the evaluating unit of such a monitoring device, the virtual geometry elements are projected into the real spatial area. This projection is reversibly unambiguous due to the configuration plane defined on the basis of real spatial points. Monitoring areas in the form of the geometry elements can thus be reliably and safely configured.

Since the geometry elements are visually shown in or on the real image of the spatial area and, in addition, represent an unambiguous projection into the real spatial area, the new method and system provide for a simple and convenient configuration. Moreover, the user can identify and assess the position and extent of monitoring areas in relation to the real machine or installation very well.

Overall, the new method and system thus provide for a simple and reliable configuration of a monitoring device of the type initially described.

In a refinement of the invention, a plurality of setup marks are placed in the spatial area before the three-dimensional image is recorded in order to determine the spatial points in the image.

The setup marks are patterns with a defined structure which can be recognized unambiguously and rapidly in the image of the spatial area. Using such setup marks facilitates the automatic determination of the spatial points and thus increases the convenience in configuring the monitoring device. On the other hand, using defined setup marks contributes to avoiding errors in the determination and allocation of the spatial points. The configuration of the monitoring device becomes even more simple and reliable, therefore.

In a further refinement, the setup marks are automatically sought in the image and marked with a symbol.

This refinement includes a first control capability since the user can easily check by means of the (automatically issued) symbol whether the position of the defined setup marks is detected and accepted by the configuration device. In addition, configuration is facilitated and the time needed for the configuration is reduced.

In a further refinement, the setup marks are removed before the monitoring device is taken into operation.

This refinement improves the protection of the monitoring device against deliberate or unintentional manipulation since a (re-)configuration without the setup marks is prevented.

In a further refinement, at least three spatial points are determined which are not located on a common straight line.

This embodiment provides for a free choice of planes in relation to the real spatial area. The user can freely define the configuration plane in the monitored spatial area. The configuration can thus be optimally adapted to the individual conditions of a monitored machine or installation. As an alternative, one or two suspension points of the configuration plane could be predetermined, so that the user can then vary the plane only to a restricted extent.

In a further refinement, the configuration plane is determined by means of the at least three spatial points and a fourth spatial point is determined which is outside the configuration plane.

This embodiment makes it easier to define a user coordinate system, the origin of which is on or underneath an object such as, for example, a switchgear cabinet. In such a case, the origin of the coordinate system is advantageously placed on the projection of the fourth spatial point into a configuration plane which is determined by the other three spatial points. This embodiment increases the flexibility and further simplifies the configuration.

In a further refinement, the configuration plane is graphically superimposed onto the displayed image.

In preferred illustrative embodiments, the configuration plane is superimposed in the form of a grid network or in the form of concentric circles and/or radial lines (starting from the origin of a coordinate system defined in relation to the plane) into the displayed real image of the spatial area. Furthermore, it is preferred if lines of sight of the image recording unit(s), projected shadows and other auxiliary lines are superimposed into the displayed image for defining the monitoring areas. The superimposition of such "artificial" auxiliary elements into the displayed real image facilities the precise definition of monitoring spaces and, in particular, contributes to implement a gapless protection.

In a further embodiment, the variable geometry element is graphically superimposed into the displayed image.

Superimposing the variable geometry elements enables the monitoring areas to be graphically determined which is particularly simple and convenient. In this manner, the monitoring area set up can also be checked rapidly and reliably.

Advantageously, a library with a plurality of predefined geometry elements is provided from which the user can select suitable geometry elements which further accelerates the configuration of the monitoring device. Furthermore, it is preferred that the user can extend the library with this own geometry elements and/or import geometry elements from commonly used CAD programs.

It is also preferred if the user can switch between a 2D view and a 3D view during the configuration in order to assess the monitoring areas in different views.

In a further refinement, the geometry element has side faces which are perpendicular to the configuration plane.

In contrast, it is basically possible to determine geometry elements which are at an oblique angle to the configuration plane. Restriction to perpendicular geometry elements, however, prevents the monitoring spaces from becoming confused and therefore contributes to increased safety when protecting a machine or installation.

In a further refinement, a plurality of geometry elements are determined and combined with one another.

In this refinement, an arrangement of geometry elements is thus determined and the monitoring device is configured by using this arrangement or combination of a number of individual monitoring spaces. This embodiment is a very simple and efficient possibility which, on the one hand, provides the user with high flexibility and, on the other hand, contributes to providing for clear and thus safe configuration.

In a further refinement, a plurality of reference marks are placed in the spatial area and recorded together with the image, with a reference position being determined for each reference mark.

The reference marks are advantageously well-defined patterns in the spatial area which are distinguished from the pattern of the setup marks. This embodiment can be used for easily checking the alignment of the at least one image recording unit and also its correct functioning.

In a further refinement, the monitoring device comprises at least a first and a second image recording unit which are arranged spatially offset with respect to one another and generate a first and a partially offset second image of the spatial area, a common image area of the first and second image being displayed as three-dimensional image.

This information is of great advantage for reliably configuring monitoring areas because the observation areas of two spatially offset image recording units always have an offset viewing angle—even if only slightly. To protect hazardous machines and installations, however, it is important to define the monitoring areas in such a manner that all image recording units involved can observe the corresponding spatial area. This embodiment is particularly advantageous if the three-dimensional image is generated by using stereoscopic methods. However, it can also be advantageously used in other monitoring devices which, for example, use two or more image recording units only for reasons of redundancy.

In a further refinement, the data record defines a part of the spatial area which corresponds to the geometry element, wherein an object is introduced into the part of the spatial area and wherein a live image of the object is recorded during the introduction into the part of the spatial area and this live image is archived.

In this refinement, a real check is made whether the monitoring device actually responds in the desired manner after the geometry elements have been defined. This check is advantageously recorded with a live image and archived. The refinement provides a very simple and convenient possibility for documenting the configuration which is of great significance in the protection of machines and installations.

It goes without saying that the aforementioned features and those still to be explained below can be used not only in the specified combination but also in other combinations or on their own without departing from the scope of the present invention.

BRIEF DESCRIPTION OF THE DRAWINGS

Illustrative embodiments of the invention are shown in the drawing and will be explained in greater detail in the following description, wherein.

DESCRIPTION OF PREFERRED EMBODIMENTS

Figure 1:
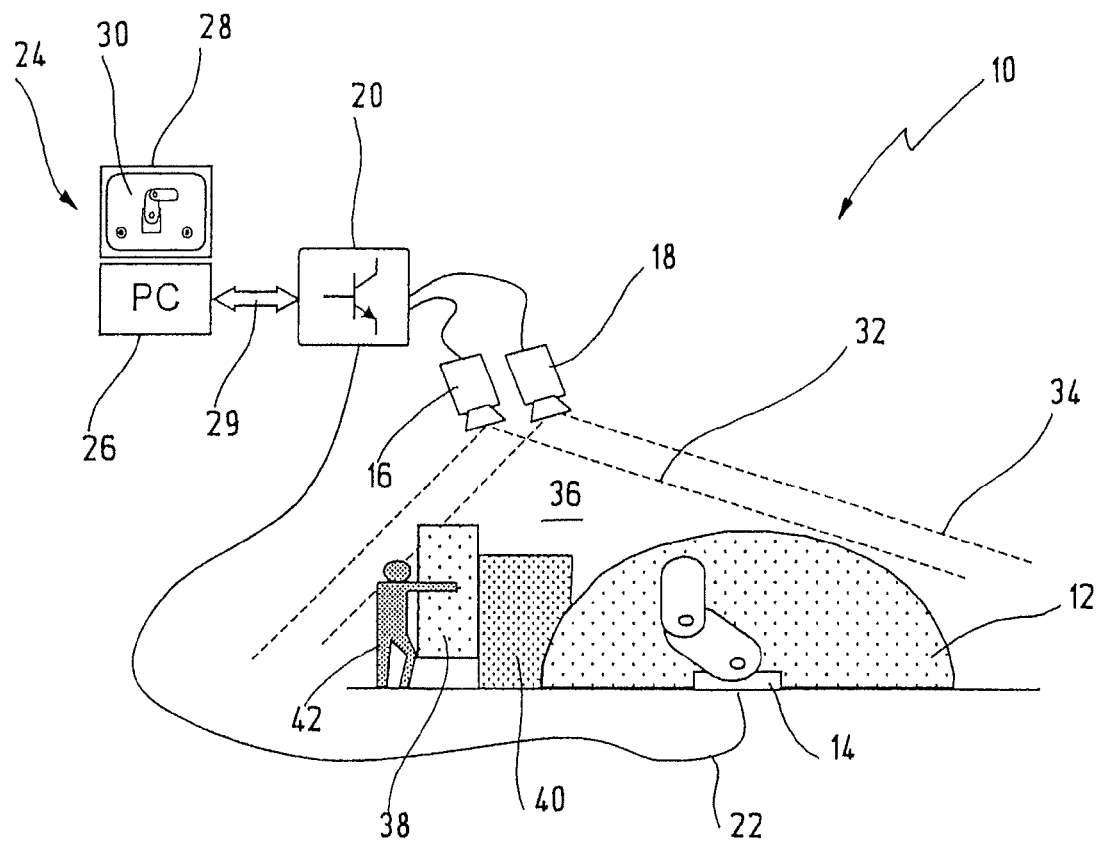
FIG. 1 shows a schematic representation of an embodiment wherein a monitoring device including two image recording units protects the working area of a robot.

In FIG. 1, an illustrative embodiment of a monitoring device in accordance with the present invention is designated by the reference number 10 in its totality. The monitoring device 10 is here used for monitoring the hazardous working area 12 of a robot 14. This is a preferred illustrative application of the novel monitoring device. However, the invention is not restricted to this and can also be used for protecting other machines and installations.

In addition, the present invention can also be used in other fields, such as for configuring monitoring areas for monitoring valuable objects (strongroom monitoring et al.) and/or for monitoring entry areas in public buildings, at airports etc. It can also be used for configuring monitoring areas as part of quality control and quality assurance.

The monitoring device 10 here comprises two image recording units 16, 18 which, for the sake of simplicity, will be called cameras in the following. In a particularly preferred embodiment of the present application, the monitoring device comprises three cameras which, together, span an approximately equilateral triangle. The cameras 16, 18 are used for recording a three-dimensional image of the robot 14 and its environmental area, with the range information being obtained in the preferred embodiments by means of three-dimensional scenery analysis methods as described in the WO 2004/029502 A1 mentioned initially, which is incorporated here by reference to its full extent.

As an alternative, the present invention can also be used in monitoring devices which pick up a three-dimensional image by means of propagation time measuring methods or in other ways.

It is preferred if the cameras 16, 18 pick up grey scale and/or colour images of the monitored spatial area. In principle, however, the cameras 16, 18 can also record infrared images or images in another wavelength band.

Reference number 20 designates an evaluating unit which receives and evaluates the images of the cameras 16, 18 in order to stop the robot 14 in dependence thereon. Consequently, evaluating unit 20 is connected to the robot 14 via a link 22.

Evaluating unit 20 can be a part of the operational control of the robot 14. Preferably, however, it is a separate evaluating unit which handles the safety-related monitoring of the robot by itself. The operational control (not shown here) of the robot 14 is then implemented separately.

Reference number 24 designates a configuration device by means of which the monitoring device 10 can be configured. According to a preferred embodiment, the configuration device comprises a conventional PC 26 with a display 28. The PC 26 is connected to the evaluating unit 20 via a data link 29. In a preferred illustrative embodiment, the data link 29 is an Ethernet link or a SafetyBus® link. The latter is a field bus system of the present applicant, developed specially for safety-related applications. In other illustrative embodiments, the configuration device 24 is integrated in the evaluating unit 20. In this case, the communication interface between the evaluating unit and the configuration device is an internal interface between the two functional units which can be, for example, a software interface.

On display 28, an image 30 of the monitored spatial area 12 is shown. According to a preferred illustrative embodiment, it is a "frozen" real image of the spatial area 12 recorded with the cameras 16, 18. In the preferred illustrative embodiment, the monitoring areas are configured by means of graphically generated geometry elements which are superimposed into the image 30 (see FIGS. 3 and 4).

The pickup or viewing areas of the cameras 16, 18 are shown symbolically at reference numbers 32, 34. As can be easily seen, areas 32, 34 of the two cameras 16, 18 are slightly offset with respect to one another and there is a common overlapping pickup area which is designated by the reference number 36. Configuration and monitoring of the spatial area is advantageously made only for the common pickup area 36.

Reference number 38 designates a first monitoring area which is called warning area in the following follows. Reference number 40 designates a second monitoring area which will be called protection or stop area in the following.

As is shown by way of example in FIG. 1, monitoring areas 38, 40 form a virtual fence which prevents an undetected penetration of a person 42 into the working area 12 of the robot 14. As is shown by means of warning area 38, this fence can "float", i.e. it does not necessarily have to sit on the ground.

Figure 2:
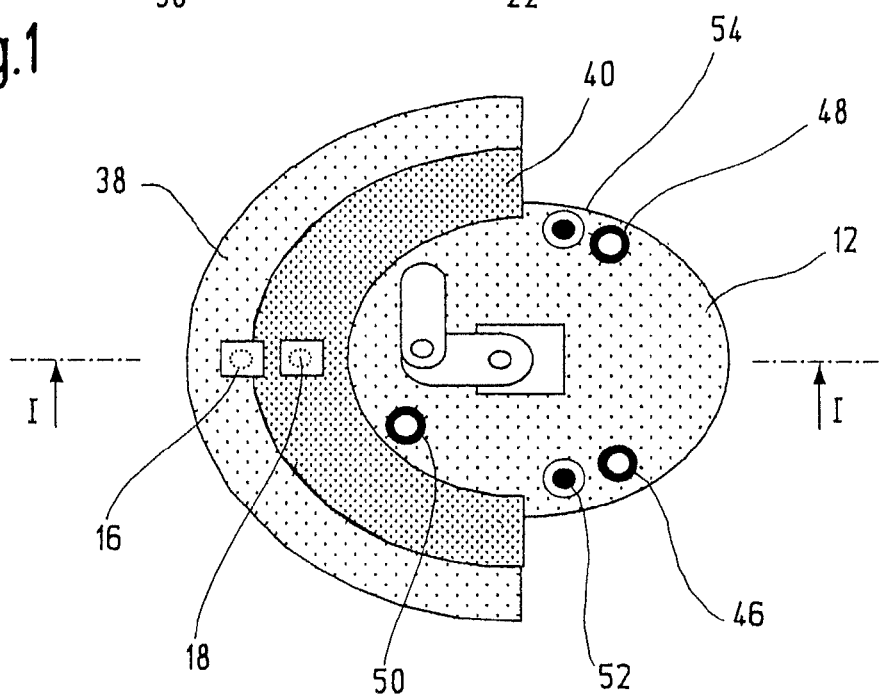
FIG. 2 shows the embodiment of FIG. 1 in a top view.

FIG. 2 shows the position of the warning and protection area 38, 40 from the top. As shown, the two areas surround the working area of the robot 12 approximately semicircularly. The open part of the working area 12 can be protected, for example, by mechanical barriers (not shown here). It goes without saying that the monitoring areas 38, 40 may also completely surround the working area 12 of the robot 14, or may have a different course.

Reference numbers 46, 48, 50 designate three setup marks which are placed on the floor in order to configure the monitoring device 10 in a manner described in the following. These setup marks are advantageously removed after the configuration process.

Reference numbers 52, 54 represent two reference marks which are also arranged in the pickup area 36 of the cameras 16, 18. In contrast to the setup marks, those reference marks 52, 54 remain in the common pickup area 36. During operation of the monitoring device 10, they can be used for checking whether the pickup areas 32, 34 of the cameras 16, 18 have shifted and/or whether the optics of the cameras 16, 18 are soiled.

As shown in FIG. 2, the setup marks 46, 48, 50 and the reference marks 52, 54 differ recognizably from one another. In both cases, however, the marks comprise a defined high-contrast pattern which provides for a simple recognition in the image 30 picked up.

In the following, a preferred illustrative embodiment for configuring the monitoring device 10 is described with reference to FIGS. 3, 4 and 5. Identical reference symbols designate the same elements as before.

Figure 3:
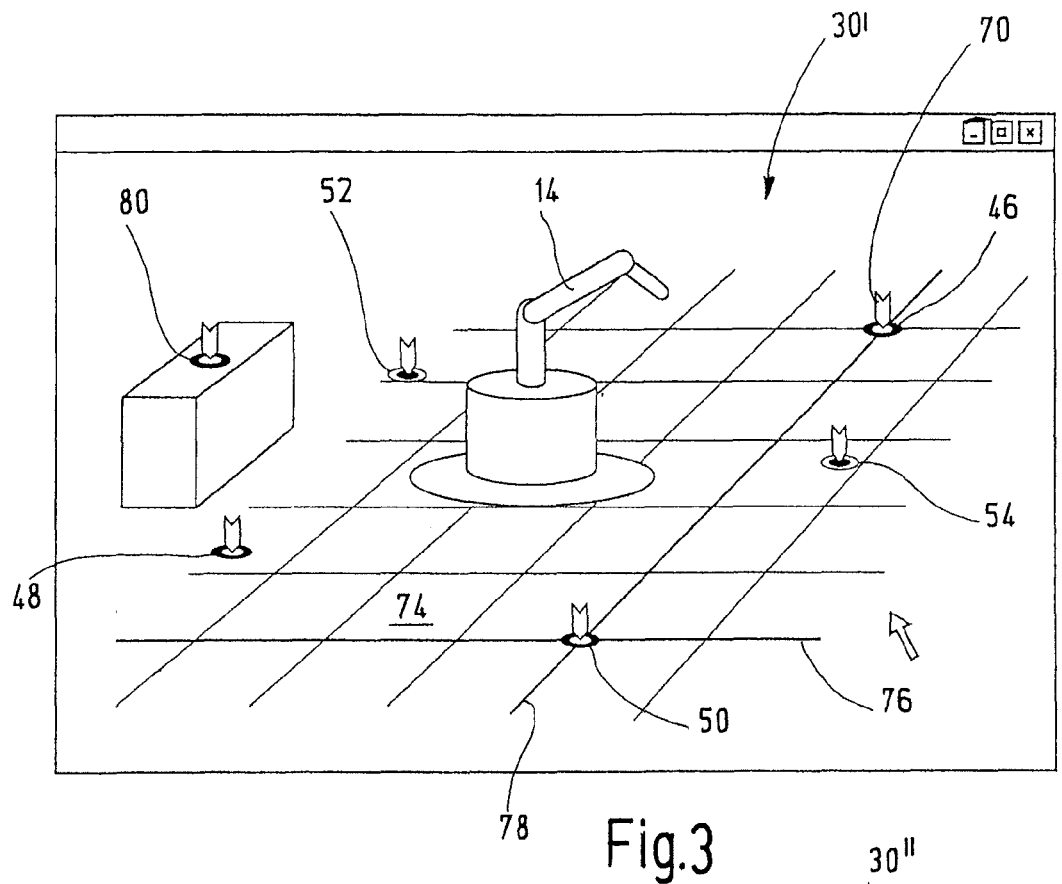
FIG. 3 shows a simplified representation of a screen display when configuring the monitoring device of FIGS. 1 and 2 according to a preferred illustrative embodiment.
Figure 4:
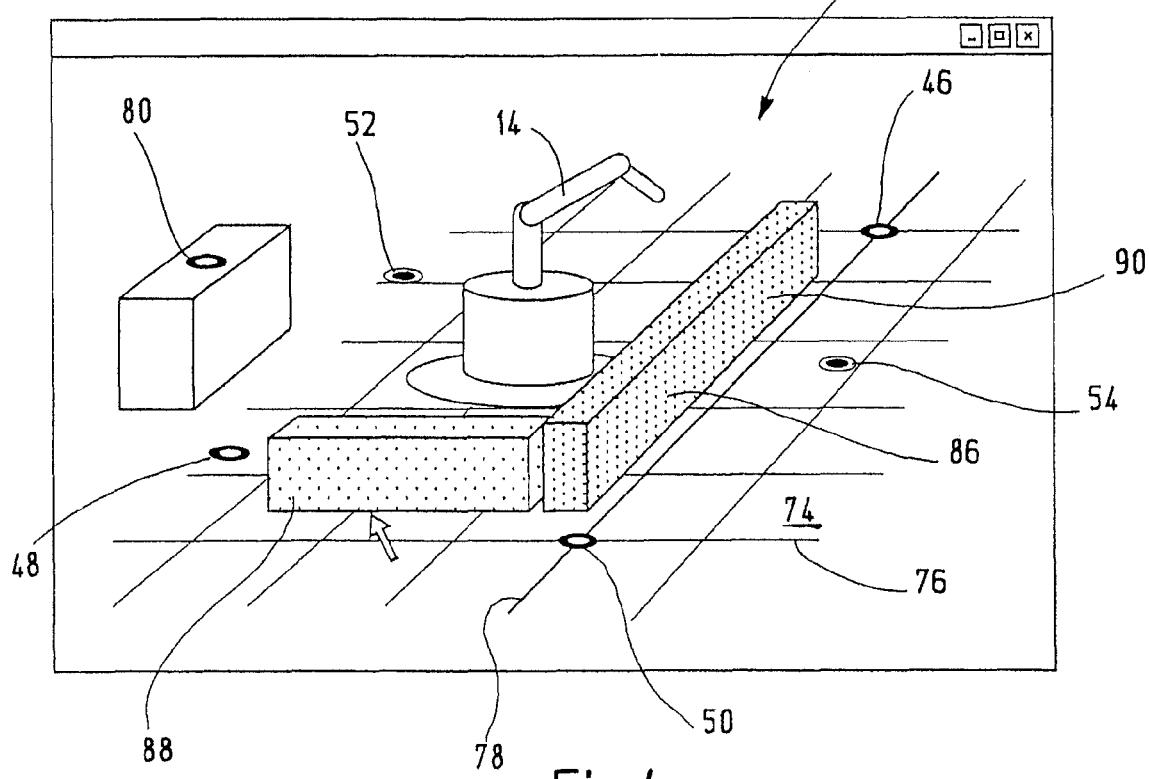
FIG. 4 shows a further screen display when configuring the monitoring device from FIGS. 1 and 2 according to a preferred illustrative embodiment.
Figure 5:
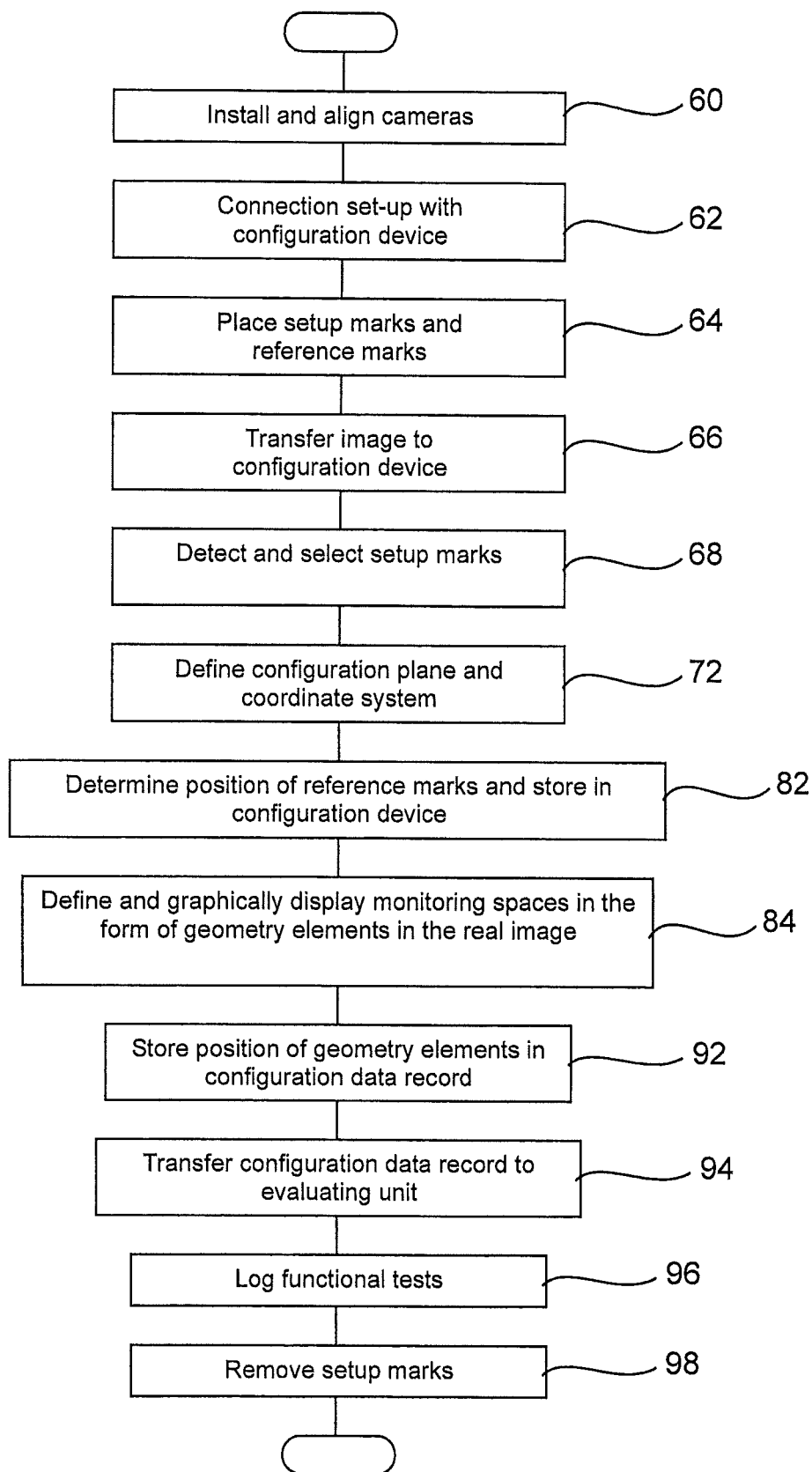
FIG. 5 shows a flowchart for explaining a preferred illustrative embodiment of the method according to the invention.

In FIGS. 3 and 4, two screen views are illustrated which show intermediate steps during the configuration process of the monitoring device 10 by means of the configuration device 24. FIG. 5 explains the individual method steps by means of a flowchart.

According to step 60, the cameras 16, 18 must first be installed and aligned to the working area 12 of the robot 14. Preferably, the two cameras are first roughly aligned mechanically. This is followed by "electronic fine adjustment", i.e. the precise monitoring area is selected electronically. Then, according to step 62, a connection of the configuration device 24 is set up to the evaluating unit 20. According to step 64, the setup marks 46, 48, 50 and the reference marks 52, 54 are placed in the pickup area 36 of the two cameras 16, 18. According to step 66, an image is then picked up by means of the two cameras 16, 18 and transferred to the configuration device 24. The image 30 (with supplementary range information obtained, for example, from stereo image processing) is stored in a memory (not shown here) of the configuration device 25 and displayed on the display 28 for the simple configuration of monitoring areas. FIGS. 3 and 4 show the image 30' and 30" at the intermediate steps of the novel method explained further below.

According to step 68, the setup marks 46, 48, 50 are first sought in the image 30. Preferably, this search is performed automatically by means of a suitable image processing algorithm which looks for the known patterns of the setup marks 46, 48, 50 in the image. When the algorithm has detected a setup mark, it is marked with a symbol 70 so that the applicant can recognize whether the algorithm has detected the "correct" setup marks and correctly determined their position. As an alternative or supplementary thereto, the method can also be performed, in principle, with "natural" setup marks, that is to say on the basis of existing object points.

In the representation in FIG. 3, the symbol 70 is a vertical arrow which points to the calculated centre point of each setup mark 46, 48, 50. However, there can also be other symbols 70, for example a frame-shaped marking around each setup mark detected.

According to step 72, a configuration plane 74 is then defined by selecting three setup marks 46, 48, 50. The configuration plane 74 is here symbolized by a grid network which is superimposed onto the frozen real image of the spatial area.

In addition, a coordinate system is defined which is represented in FIGS. 3 and 4 by means of coordinate axes 76, 78. In the illustrative embodiment described here, the origin of the coordinate system is located on the setup mark 50. However, the user could also select another set up mark as origin of the coordinate system.

In particular, a preferred illustrative embodiment of the invention enables the origin of the coordinate system to be placed in the projection of the fourth setup mark 80 on the configuration plane. The setup mark 80 is here, for example, on a switchgear cabinet. In the preferred illustrative embodiment, the user can also freely select the direction of the coordinate axes.

According to step 82, the position of the reference marks 52, 54 is determined and stored in a configuration data record. If a number of reference marks 52, 54 are arranged in the common pickup area 36 of the cameras 16, 18, the user can select or deselect all or individual reference marks. It is the positions of the selected reference marks 32, 54 which are monitored and evaluated later when the monitoring device 10 is in operation.

According to step 84, monitoring spaces are determined and graphically indicated in the form of geometry elements 86, 88 which are superimposed into the real image 30".

In a preferred illustrative embodiment of the invention, the user can generate the geometry elements 86, 88 graphically by means of a mouse in the real image 30". In a particularly preferred embodiment, the user is provided with a library of prepared geometry elements (not shown here) from which he can select and parameterize suitable geometry elements.

Furthermore, it is preferred if each geometry element has side faces 90 which are perpendicular to the configuration plane 74 because this creates simple monitoring spaces, the connection with one another of which can be easily checked. In another illustrative embodiment, however, it is possible that the user can also parameterize the angular position of the side walls 90 and/or the course of the contour of the side walls 90.

In the illustrative embodiment according to FIG. 4, it is provided that the user can generate a number of geometry elements 86, 88 which are combined to form an arrangement of geometry elements. In this manner, complex monitoring areas can be easily constructed from relatively simple geometry elements 86, 88.

In a preferred illustrative embodiment of the invention, the user must also specify for each geometry element 86, 88 whether this is a warning zone 38, a protection zone 40 or an area which is not to be monitored and evaluated at all by the monitoring device 10 (blanking).

When the determination of the individual geometry elements 86, 88 has been concluded, the positions of the geometry elements 86, 88 are stored in the configuration data record according to step 92. In this process, the position of each geometry element 86, 88 relative to the configuration plane 74 is determined. Due to the defined relation between the configuration plane 74 and the real setup marks 46, 48, 50 there is an unambiguous relationship between the position of the virtual geometry elements (=monitoring areas) and the real space coordinates.

In step 92, the position of the geometry elements is stored in the configuration data record in such a manner that the evaluating unit 20 takes into consideration the position and extent of the geometry elements 86, 88 as monitoring area.

According to step 94, the configuration data record is then transferred to the evaluating unit 20 via data link 29.

According to step 96, a functional test of the configured monitoring areas is then performed by a person 42 "violating" the monitoring areas by means of a test body. This process is recorded by means of the cameras 16, 18 in the same manner as when the monitoring device 10 is in operation. The recorded images are transferred to the configuration device 24. As soon as the evaluating unit 20 detects a violation of a monitoring area, a corresponding signal is transmitted to the configuration device 24. The configuration device 24 then stores the associated real image and archives it in a function test protocol.

When all function tests have successfully been concluded, the configuration of the monitoring device 10 can be ended. According to step 98, the setup marks 46, 48, 50 are advantageously removed so that a manipulation of the configuration is prevented.

The configuration data record is advantageously transferred from the configuration device 24 to the evaluating unit 20 by using error-protecting measures. These can include one or more of the following: authentication of the transmitting configuration device, unambiguous designation of the receiving evaluating unit 20, transmitting a connection number in order to ensure continuous authorization in the case of command sequences, ensuring the data representation and consistency by using data protection measures such as CRC, and encrypting the useful data in order to guarantee confidentiality.

Overall, the following safety aspects and mechanisms are implemented: confidentiality: a message should only be readable by the receiver addressed in each case; for this purpose, encryption is used, authorization: the user configuring the system must prove his authorization, data consistency: a data transmission between the configuration device and the evaluating unit must arrive at the receiver without changes, credibility: a message must have been created verifiably by the alleged transmitter, i.e. the transmitter must identify himself verifiably, and liability: the transmitter of a message should not be able to deny that he is the originator of a message created him; this is preferably implemented by a suitable signature.

Furthermore, it is preferred if the evaluating unit 20 itself checks the received protection space configuration. A first checking step includes a plausibility test. In particular, this checks whether all configured monitoring spaces are within the common pickup area 36.

It is also preferred if the evaluating unit 20 repeats the calculation of the monitoring areas by means of the data input by the user in the configuration device 24 in order to provide in this manner a redundancy which enables errors to be detected. For this purpose, the evaluating unit 20 only needs the configuration data input by the user which can be transmitted to the evaluating unit 20 via the data link 29.

Checking the configuration in and by means of the evaluating unit 20 is of advantage, in particular, if the configuration device 24 comprises a conventional, and thus non-failsafe PC.

What is claimed is:

1. A method for failsafely monitoring the operation of an automated machine or installation that defines a hazardous area located at least partially within a spatial area monitored by a camera-based monitoring device having at least one image recording unit adapted to generate a three-dimensional image of the spatial area, comprising the steps of:
   configuring a safety zone outside the hazardous area and within the spatial area, wherein said configuring step further comprises the steps of:
   recording and displaying on a display device a true three-dimensional image of the spatial area by means of the at least one image recording unit,
   determining a plurality of spatial points within the true three-dimensional image defining a coordinate system of the spatial area,
   defining a virtual configuration plane using said spatial points,
   defining a virtual boundary between the safety zone and the hazardous area by generating at least one variable geometry element with a selected dimension and position relative to the configuration plane, with the variable geometry element being visually superimposed onto the displayed true three-dimensional image in the selected position, wherein the selected position of the variable geometry element can be in any desired location within the spatial area,
   generating a data record representing a transformation of the dimension and position of the variable geometry element into the coordinate system of the spatial area, and
   transferring said data record to the monitoring device; and
   thereafter monitoring in real-time via said monitoring device the spatial area as a function of said data record to detect when an object breaches the virtual boundary between the safety zone and the hazardous area defined by the at least one variable geometry element, and
   failsafely interrupting the operation of said automated machine or installation when an object breaches said virtual boundary.

2. The method of claim 1, wherein a plurality of setup marks are placed in the spatial area prior to the step of recording the true three-dimensional image, and wherein the step of determining a plurality of spatial points comprises an identification of said setup marks within the true three-dimensional image.

3. The method of claim 2, wherein the setup marks are automatically identified in the three-dimensional image and marked with a symbol which is graphically superimposed onto the three-dimensional image displayed.

4. The method of claim 2, wherein the setup marks are removed after the configuration and before the monitoring device is put into operation.

5. The method of claim 1, wherein at least three spatial points which are not located on a common straight line are determined for defining the virtual configuration plane.

6. The method of claim 5, wherein the virtual configuration plane is defined by means of the at least three spatial points, and wherein a fourth spatial point is determined which is outside of the virtual configuration plane, said fourth spatial point being used in order to define an origin of the coordinate system of the spatial area.

7. The method of claim 1, wherein the virtual configuration plane is graphically superimposed onto the displayed three-dimensional image.

8. The method of claim 1, wherein the variable geometry element is graphically superimposed onto the displayed three-dimensional image.

9. The method of claim 1, wherein the variable geometry element is exclusively generated with side faces which are perpendicular to the configuration plane.

10. The method of claim 1, wherein a plurality of variable geometry elements are generated and combined with one another.

11. The method of claim 1, wherein a plurality of reference marks are placed in the spatial area and are recorded together with the three-dimensional image, and wherein a reference position for each reference mark is determined and stored in the data record.

12. The method of claim 1, wherein the monitoring device comprises at least a first and a second image recording unit which are arranged spatially offset with respect to one another and generate a first and a partially offset second image of the spatial area, the first and second images having a common image area, and wherein the common image area is displayed as a part of the three-dimensional image.

13. The method of claim 12, wherein the first and second images are subjected to a stereo analysis in order to determine range information relating to objects within the spatial area, and wherein said range information forms a part of the true three-dimensional image.

14. The method of claim 1, wherein the data record defines a section of the spatial area which corresponds to the variable geometry element, wherein an object is introduced into the section of the spatial area, wherein a live image of the object is recorded during said introduction into the section, and wherein said live image is archived.

15. The method of claim 1, wherein a cyclic redundancy checksum is generated for the data record and transferred to the monitoring device, and wherein the monitoring device accepts or rejects the data record as a function of said cyclic redundancy checksum.

16. The method of claim 1, wherein the true three-dimensional image of the spatial area is stored in a configuration device for defining the virtual configuration plane and generating the data record.

17. The method of claim 1, wherein the true three-dimensional image of the spatial area is a live image during the steps of defining the virtual configuration plane and generating the variable geometry elements.

18. A system for failsafely monitoring the operation of an automated machine or installation that defines a hazardous area located at least partially within a spatial area, by monitoring a safety zone outside the hazardous area and within the spatial area, comprising:

at least one camera-based image recording unit for generating a true three-dimensional image of the spatial area, an evaluating unit for triggering a control function in dependence upon a detected incursion into the safety zone, and a configuration device for configuring the evaluating unit by creating a virtual boundary between the hazardous area and the safety zone;

wherein the configuration device further comprises:

a display for displaying the true three-dimensional image of the spatial area, a first configuration element for determining a plurality of spatial points within the true three-dimensional image defining a coordinate system of the spatial area, a second configuration element for defining a virtual configuration plane by using said spatial points, a third configuration element for defining the virtual boundary of the safety zone by generating at least one variable geometry element with a selected dimension and position relative to the configuration plane, wherein the third configuration element is designed for superimposing the variable geometry element onto the displayed true three-dimensional image in the selected position, and further wherein the selected position of the variable geometry element can be in any desired location within the spatial area, a fourth configuration element for generating a data record which represents a transformation of the variable geometry element into the coordinate system of the spatial area, and a communication interface for transferring the data record to the evaluating unit;

and further wherein the evaluating unit monitors in real-time via said image recording unit the spatial area as a function of the data record to detect when an object breaches the virtual boundary between the safety zone and the hazardous area defined by the at least one variable geometry element, and failsafely interrupts operation of said automated machine or installation when a breach is detected.

19. A non-transitory computer readable storage medium containing program code to be executed on a computer of a system for failsafely monitoring the operation of an automated machine or installation that defines a hazardous area at least partially located within a spatial area monitored by a camera-based monitoring device having at least one image recording unit for generating a three-dimensional image of the spatial area, the program code enabling the system to carry out a method comprising the steps of:

configuring a safety zone outside the hazardous area and within the spatial area, wherein said configuring step further comprises the steps of:

recording and displaying on a display device a true three-dimensional image of the spatial area by means of the at least one image recording unit, determining a plurality of spatial points within the true three-dimensional image defining a coordinate system of the spatial area, defining a virtual configuration plane using said spatial points, defining a virtual boundary between the hazardous area and the safety zone by generating at least one variable geometry element with a selected dimension and position relative to the configuration plane, with the variable geometry element being visually superimposed onto the displayed true three-dimensional image in the selected position, wherein the selected position of the variable geometry element can be in any desired location within the spatial area, generating a data record which represents a transformation of the dimension and position of the variable geometry element into the coordinate system of the spatial area, and transferring the data record to the monitoring device; and thereafter monitoring in real-time via the monitoring device the spatial area using said data record to detect when an object breaches the virtual boundary between the safety zone and the hazardous area defined by the at least one variable geometry element.

20. In a system for failsafely monitoring the operation of an automated machine or installation that defines a hazardous area located at least partially within a spatial area, a method for configuring a safety zone outside the hazardous area and within the spatial area monitored by a camera-based monitoring device comprising at least one image recording unit adapted to generate a three-dimensional image of the spatial area, the method comprising the steps of:

recording and displaying on a display device a true three-dimensional image of the spatial area by means of the at least one image recording unit, determining a plurality of spatial points within the true three-dimensional image defining a coordinate system of the spatial area, defining a virtual configuration plane using said spatial points, defining a virtual boundary between the safety zone and the hazardous area by generating at least one variable geometry element with a selected dimension and position relative to the configuration plane, with the variable geometry element being visually superimposed onto the displayed true three-dimensional image in the selected position, wherein the selected position of the variable geometry element can be in any desired location within the spatial area, generating a data record representing a transformation of the dimension and position of the variable geometry element into the coordinate system of the spatial area, and transferring said data record to the monitoring device, wherein the monitoring device is designed to monitor in real-time the spatial area as a function of said data record to detect when an object breaches the virtual boundary between the safety zone and the hazardous area defined by the at least one variable geometry element;

wherein a plurality of setup marks are placed in the spatial area prior to the step of recording the true three-dimensional image, and wherein the step of determining a plurality of spatial points comprises an identification of said setup marks within the true three-dimensional image.

21. The method of claim 20, wherein the setup marks are automatically identified in the three-dimensional image and marked with a symbol which is graphically superimposed onto the three-dimensional image displayed.

22. The method of claim 20, wherein the setup marks are removed after the configuration and before the monitoring device is put into operation.

* * * * *